US007256366B2

(12) United States Patent
Severance, Jr.

(10) Patent No.: US 7,256,366 B2
(45) Date of Patent: Aug. 14, 2007

(54) PLASMA ARC TORCH, AND METHODS OF ASSEMBLING AND DISASSEMBLING A PLASMA ARC TORCH

(75) Inventor: Wayne Stanley Severance, Jr., Darlington, SC (US)

(73) Assignee: The Esab Group, Inc., Florence, SC (US)

( * ) Notice: Subject to any disclaimer, the term of this patent is extended or adjusted under 35 U.S.C. 154(b) by 47 days.

(21) Appl. No.: 11/313,357

(22) Filed: Dec. 21, 2005

(65) Prior Publication Data

US 2007/0138148 A1 Jun. 21, 2007

(51) Int. Cl.
*B32K 10/00* (2006.01)

(52) U.S. Cl. ............................ 219/121.48; 219/121.5; 219/121.45

(58) Field of Classification Search ........... 219/121.48, 219/121.36, 121.5, 121.45, 75, 121.52, 121.51, 219/121.49, 121.54; 313/231.31, 231.41, 313/326; 427/446; 239/132.3, 600
See application file for complete search history.

(56) References Cited

U.S. PATENT DOCUMENTS 5,101,088 A * 3/1992 Andersson et al. .... 219/121.45
6,320,156 B1 * 11/2001 Yamaguchi et al. ..... 219/121.5
6,346,685 B2 2/2002 Severance, Jr. et al.
6,987,237 B2 * 1/2006 Walters .................. 219/121.5

* cited by examiner

*Primary Examiner*—Quang Van
(74) *Attorney, Agent, or Firm*—Alston & Bird LLP

(57) ABSTRACT

A plasma arc torch and methods for assembling and disassembling a plasma arc torch wherein a plurality of front end parts of the torch form a unit that is removable from the torch in a single operation to gain access to the electrode. The unit can then be reinstalled in the torch in a single operation after replacement of the electrode. An assembly fixture is employed to facilitate pre-assembly of the unit of front end parts prior to installation of the unit in a torch.

19 Claims, 4 Drawing Sheets

PRIOR ART

PLASMA ARC TORCH, AND METHODS OF ASSEMBLING AND DISASSEMBLING A PLASMA ARC TORCH

BACKGROUND OF THE INVENTION

The present invention relates to plasma arc torches and to methods of assembling and disassembling such torches.

A plasma arc torch generally comprises a torch body assembly that supports an electrode for emitting an electrical arc that attaches to a workpiece to be operated upon, and a nozzle for directing a flow of a plasma gas toward the workpiece such that the plasma gas stream surrounds the arc. The electrode and nozzle generally are regarded as "consumables" that are subject to deterioration during operation of the torch and that therefore must be replaced periodically in order to restore the torch to a proper condition for satisfactory operation. Typically a plasma arc torch includes a number of front end parts that must be removed in order to gain access to the consumables for replacement. In many existing plasma arc torches, the various front end parts must be removed one at a time, and then reinstalled one at a time after replacement of the consumables. The process thus is relatively inefficient and cumbersome.

BRIEF SUMMARY OF THE INVENTION

The present invention addresses the above needs and achieves other advantages, by providing a plasma arc torch and methods for assembling and disassembling a plasma arc torch wherein, in one embodiment of the invention, a plurality of front end parts form a unit that is removable from the torch in a single operation to gain access to the electrode. The unit can then be reinstalled in the torch in a single operation after replacement of the electrode.

In accordance with one embodiment of the invention, a plasma arc torch comprises a torch body assembly comprising a generally cylindrical torch body and an insulator body disposed in the torch body, and an electrode assembly mounted in the torch body assembly, an electrode of the electrode assembly projecting out from a front end of the insulator body. A nozzle is engaged with the torch body assembly and defines a central bore extending therethrough for directing a flow of a plasma gas from the central bore through an exit orifice defined in a front end of the nozzle, the electrode being received within the central bore such that an emissive element at a free end of the electrode is proximate the exit orifice. The nozzle comprises an externally threaded portion and a front-facing surface spaced rearwardly of the externally threaded portion.

The torch further comprises a hollow generally cylindrical nozzle retaining cup assembly comprising a rear portion forming a releasable connection with the torch body assembly and a front portion defining an aperture through which the externally threaded portion of the nozzle projects, the front portion further defining a rear-facing surface surrounding the aperture and opposing the front-facing surface of the nozzle. An internally threaded retainer engages the externally threaded portion of the nozzle and the front portion of the nozzle retaining cup assembly to urge the front-facing surface of the nozzle toward the rear-facing surface of the nozzle retaining cup assembly so as to retain the nozzle retaining cup assembly and the nozzle together as a unit. The unit is removable from the torch body assembly by disengaging the releasable connection between the nozzle retaining cup assembly and the torch body assembly so as to provide access to the electrode assembly.

In one embodiment, the releasable connection between the nozzle retaining cup assembly and the torch body assembly can comprise a threaded connection.

The removable unit of front end parts can further comprise elements for directing a flow of secondary or shielding gas toward the workpiece surrounding the primary flow of plasma gas. In one embodiment, the unit further comprises a shielding gas nozzle engaging the nozzle and concentrically surrounding the nozzle such that a shielding gas flow passage is defined between a radially inner surface of the shielding gas nozzle and a radially outer surface of the nozzle. The unit further includes a shield retainer engaging the shielding gas nozzle to retain the shielding gas nozzle in engagement with the nozzle, the shield retainer forming a releasable connection with the nozzle retaining cup assembly. The releasable connection can comprise a threaded connection.

A diffuser can be disposed between the shielding gas nozzle and the nozzle for conditioning a flow of shielding gas through the shielding gas flow passage. For example, the diffuser can direct the shielding gas with a tangential or swirl component of velocity through the shielding gas flow passage. The diffuser can be made of an insulating material to electrically insulate the nozzle and shielding gas nozzle from each other.

In one embodiment of the invention, the nozzle retaining cup assembly comprises a retaining cup defining the aperture and the rear-facing surface, and a cup holder formed separately from the retaining cup, the cup holder forming the releasable connection with the torch body assembly, the cup holder being affixed to the retaining cup. The cup holder can comprise an electrically conductive material. The retaining cup can comprise an electrically insulating material.

In accordance with a method aspect of the invention, an assembly fixture is provided having a connection portion structured and arranged to form a releasable connection with the rear portion of the nozzle retaining cup assembly, the assembly fixture defining a support surface for engaging a rear end of the nozzle and a centering portion for engaging the nozzle so as to position the nozzle concentrically with respect to the assembly fixture. A method for assembling a plasma arc torch comprises the steps of positioning the nozzle on the assembly fixture with the rear end of the nozzle on the support surface and the centering portion of the assembly fixture engaging the nozzle, placing the retaining cup assembly over the nozzle on the assembly fixture such that the externally threaded portion of the nozzle projects through the aperture and the rear-facing surface of the nozzle retaining cup assembly opposes the front-facing surface of the nozzle, and forming the releasable connection between the rear portion of the retaining cup assembly and the connection portion of the assembly fixture. The internally threaded retainer is then engaged with the externally threaded portion of the nozzle and with the front portion of the nozzle retaining cup assembly to retain the nozzle retaining cup assembly and the nozzle together as a unit, and the unit is removed from the assembly fixture and assembled with the torch body assembly by forming the releasable connection between the nozzle retaining cup assembly and the torch body assembly.

A method for disassembling a plasma arc torch in accordance with another embodiment of the invention comprises disengaging the releasable connection between the nozzle retaining cup assembly and the torch body assembly, and removing the unit from the torch body assembly so as to provide access to the electrode assembly. The electrode assembly can then be removed and replaced in whole or in part, and the unit reassembled with the torch body assembly.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present inventions now will be described more fully hereinafter with reference to the accompanying drawings in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
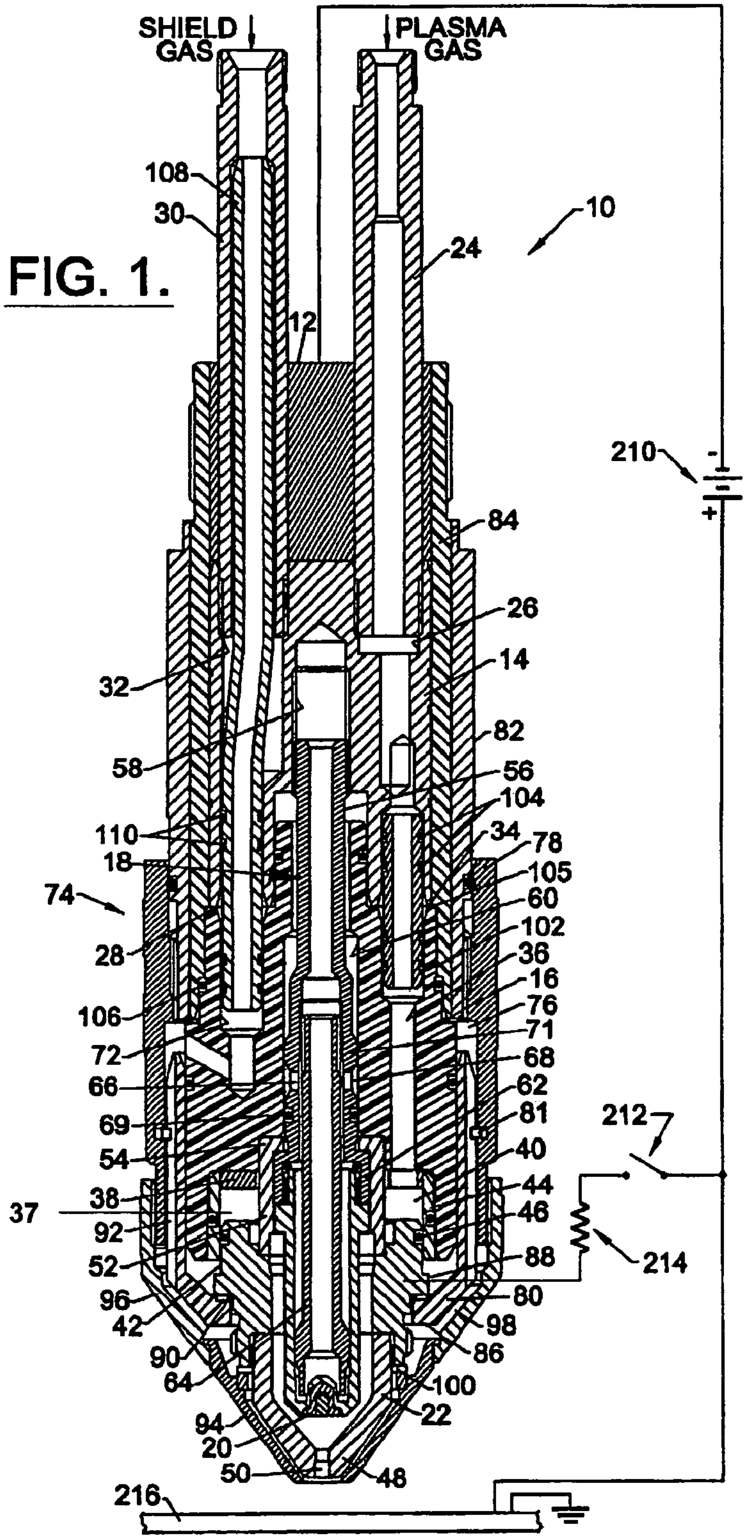
FIG. 1 is a sectioned side elevation of a known shielding gas plasma arc torch.
Figure 1A:
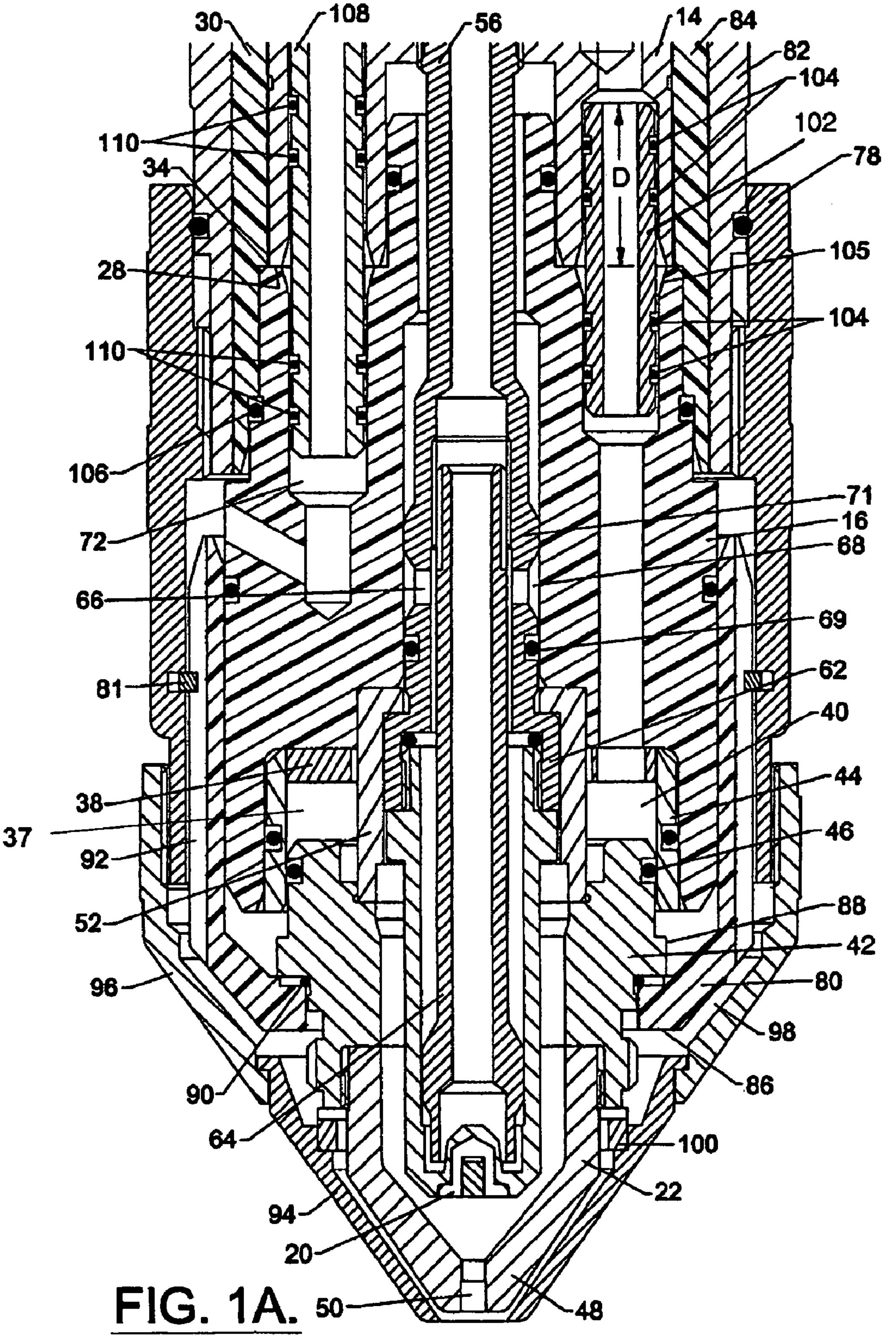
FIG. 1A. PRIOR ART
FIG. 1A is an enlarged view showing the lower portion of the torch of FIG. 1.

With reference to FIGS. 1 and 1A, a known plasma arc torch of a type to which the present invention is applicable is broadly indicated by reference numeral 10. The torch can be a shielding gas torch generally as described in U.S. Pat. No. 6,346,685, incorporated herein by reference. The torch 10 provides a swirling curtain or jet of shielding gas surrounding the electric arc during a working mode of operation of the torch. The torch 10 includes a generally cylindrical upper or rear insulator body 12 that may be formed of a potting compound or the like, a generally cylindrical main torch body 14 connected to the rear insulator body 12 and generally made of a conductive material such as metal, a generally cylindrical lower or front insulator body 16 connected to the main torch body 14, an electrode assembly 18 extending through a passage in the main torch body 14 and front insulator body 16 and supporting an electrode 20 at a free end of the electrode assembly, and a nozzle assembly 22 connected to the insulator body 16 adjacent the electrode 20. The main torch body 14 and insulator bodies 12, 16 collectively form a torch body assembly to which various front end parts are releasably attached, as further described below.

A plasma gas connector tube 24 extends through the rear insulator body 12 and is connected by screw threads into a plasma gas passage 26 of the main torch body 14. The plasma gas passage 26 extends through the main torch body 14 to a lower end face 28 thereof for supplying a plasma gas (sometimes referred to as a cutting gas), such as oxygen, air, nitrogen, or argon, to a corresponding passage in the insulator body 16, as further described below.

A shielding gas connector tube 30 extends through the rear insulator body 12 and is connected by screw threads into a shielding gas passage 32 of the main torch body 14. The shielding gas passage 32 extends through the main torch body 14 to the lower end face 28 for supplying a shielding gas, such as argon, to a corresponding passage in the insulator body 16.

The insulator body 16 has an upper end face 34 that abuts the lower end face 28 of the main torch body. A plasma gas passage 36 extends through the insulator body 16 from the upper end face 34 into a cylindrical counterbore 37 in the lower end of the insulator body 16. As further described below, the counterbore 37, together with the upper end of the nozzle assembly 22, forms a plasma gas chamber 40 from which plasma gas is supplied to a primary or plasma gas nozzle of the torch. Plasma gas from a suitable source enters the plasma gas chamber 40 by flowing through the plasma gas connector tube 24, through the plasma gas passage 26 in the main torch body 14, into the plasma gas passage 36 of the insulator body 16 that is aligned with the passage 26, and into the chamber 40. An electrical contact ring assembly 38 is disposed in the counterbore 37 for establishing electrical connection with the nozzle assembly 22.

The nozzle assembly 22 is a two-piece assembly comprising an upper nozzle member 42 and a separately formed lower nozzle tip 48. The upper nozzle member 42 has a generally cylindrical upper portion slidingly received within a metal insert sleeve 44 that is inserted into the counterbore 37 of the insulator body 16. An O-ring 46 seals the sliding interconnection between the upper nozzle member 42 and the metal insert sleeve 44. The lower nozzle tip 48 is of generally frustoconical form and is threaded into the upper nozzle member 42 and includes a nozzle exit orifice 50 at the tip end thereof. As an alternative to the two-piece nozzle assembly 22, the nozzle assembly can be formed as a one-piece nozzle, with the upper nozzle member 42 and lower nozzle tip 48 formed as an integral one-piece structure. In any event, a plasma gas flow path exists from the plasma gas chamber 40 through the upper nozzle member 42 and through the nozzle tip 48 for directing a jet of plasma gas out the nozzle exit orifice 50 to aid in performing a work operation on a workpiece.

The plasma gas jet preferably has a swirl component created, in known manner, by a hollow cylindrical ceramic gas baffle 52 partially disposed in a counterbore recess 54 of the insulator body 16. A lower end of the baffle 52 abuts an annular flange face of the upper nozzle member 42, and an annular space is formed between the baffle 52 and the inner surface of the upper nozzle member 42. The baffle 52 has non-radial holes (not shown) for directing plasma gas from the chamber 40 into the central passageway of the upper nozzle member 42 with a swirl component of velocity.

The electrode assembly 18 includes an upper tubular electrode holder 56 that has its upper end connected by screw threads within a blind axial bore 58 in the main torch body 14. The upper electrode holder 56 extends into an axial bore 60 formed through the insulator body 16, and the lower end of the electrode holder 56 includes an enlarged internally screw-threaded coupler 62 that has an outer diameter slightly smaller than the inner diameter of the ceramic gas baffle 52 that is sleeved over the outside of the coupler 62. The electrode holder also includes internal screw threads spaced above the coupler 62 for threadingly receiving a lower tube 64 that supplies coolant to the electrode 20, as further described below, and which extends outward from the axial bore of the insulator body 16 into the central passage of the nozzle tip 48. The electrode 20 can be of the type described in U.S. Pat. No. 5,097,111, assigned to the assignee of the present application, and incorporated herein by reference. The electrode 20 comprises a cup-shaped body whose open upper end is threaded by screw threads into the coupler 62 at the lower end of the electrode holder 56, and whose capped lower end is closely adjacent the lower end of the lower coolant tube 64. A coolant circulating space exists between the inner wall of the electrode 20 and the outer wall of the coolant tube 64, and between the outer wall of the coolant tube 64 and the inner wall of the electrode holder 56. The electrode holder 56 includes a plurality of holes 66 for supplying coolant from the space within the electrode holder to a space 68 between the electrode holder and the inner wall of the axial bore 60 in the insulator body 16. A seal 69 located between the holes 66 and the coupler 62 seals against the inner wall of the bore 60 to prevent coolant in the space 68 from flowing past the seal 69 toward the coupler 62. A raised annular rib or dam 71 on the outer surface of the electrode holder 56 is located on the other side of the holes 66 from the seal 69, for reasons that will be made apparent below. A coolant supply passage 70 (FIG. 2) extends through the insulator body from the space 68 through the outer cylindrical surface of the insulator body 16 for supplying coolant to the nozzle assembly 22, as further described below.

The torch 10 can include features providing improved sealing of the fluid connections between the main torch body 14 and the insulator body 16 so as to reduce the likelihood of liquid such as coolant wetting the adjoining surfaces of these bodies and finding its way to a part at nozzle potential such as the nozzle retaining cup holder 78, thereby establishing a current leakage path from the main torch body at electrode potential to the cup holder 78, which can make starting the torch difficult. To this end, a connector assembly fluidly couples the plasma gas passage 26 of main torch body 14 to the plasma gas passage 36 of the insulator body 16 and includes a coupling tube 102 having one end portion inserted into the passage 26 and the other end portion inserted into the passage 36. Each end portion includes a resilient compressible seal encircling the coupling tube. In the preferred embodiment of the invention shown in FIG. 1, each seal comprises a gland seal having a pair of O-rings 104 which are spaced apart along the coupling tube 102 and retained in grooves formed therein. The O-rings 104 are compressed between the coupling tube 102 and the inner surfaces of the passages 26 and 36. When the coupling tube 102 is inserted into each of the passages, air tends to be trapped between the O-rings 104 of each seal, thus creating an insulating air space.

Each of the passages 26 and 36 includes a receiving portion into which the coupling tube 102 is inserted, comprising a generally cylindrical passage having a tapered or flared entrance portion 105. The flared entrance portion 105 facilitates inserting the coupling tube 102 and O-rings 104 into the receiving portion of the passage.

The torch can also include an O-ring 106 disposed between the outer surface of the insulator body 16 and the inner surface of the insulating member 84 to prevent liquid from migrating therebetween and into contact with the cup holder 78. This sealing arrangement thus eliminates the "face seals" of prior plasma arc torches, in which the abutting faces of the main torch body and insulator body compress O-rings retained in recesses in one or both of the faces. Such face seals can allow liquid to wet the adjoining faces, particularly when the insulator body is disassembled from the main torch body and then reassembled, such as during repair and maintenance of the torch. In addition, the O-rings of the face seals are easy to inadvertently dislodge from their desired positions, thus preventing a proper seal. With the gland seals as described herein, the O-rings are held in place in grooves by their own elasticity and are not prone to being inadvertently dislodged.

The torch can also include features for lengthening the potential electrical path from the main torch body 14 through the shielding gas to the nozzle retaining cup holder 78. To this end, an elongate insulating conduit 108 is disposed within the shielding gas passage 72 of the insulator body 16, and extends through the shielding gas passage 32 in the main torch body 14 and into the shielding gas connector tube 30 through which shielding gas is supplied to the torch. The portions of the conduit 108 residing within the passages 32 and 72 are sealed by resilient compressible seals to prevent shielding gas from passing between the inner walls of the passages and the conduit. In the embodiment illustrated in FIG. 1, the seals comprise pairs of spaced-apart O-rings 110 retained in grooves in the outer surface of the conduit 108 and compressed between the conduit and the inner walls of the passages. The conduit 108 thus prevents an electrical leakage path from being established over the relatively short length between the lower end of the main torch body 14 and the cup holder 78. Instead, the potential leakage path is between the shielding gas connector tube 30 at the upper end of the conduit 108, through the passages 32 and 72, and to the cup holder 78. Substantially lengthening the path in this manner results in substantially increasing the total resistance of the path, thus reducing the likelihood of current leaking through the shielding gas during starting of the torch.

Figure 2:
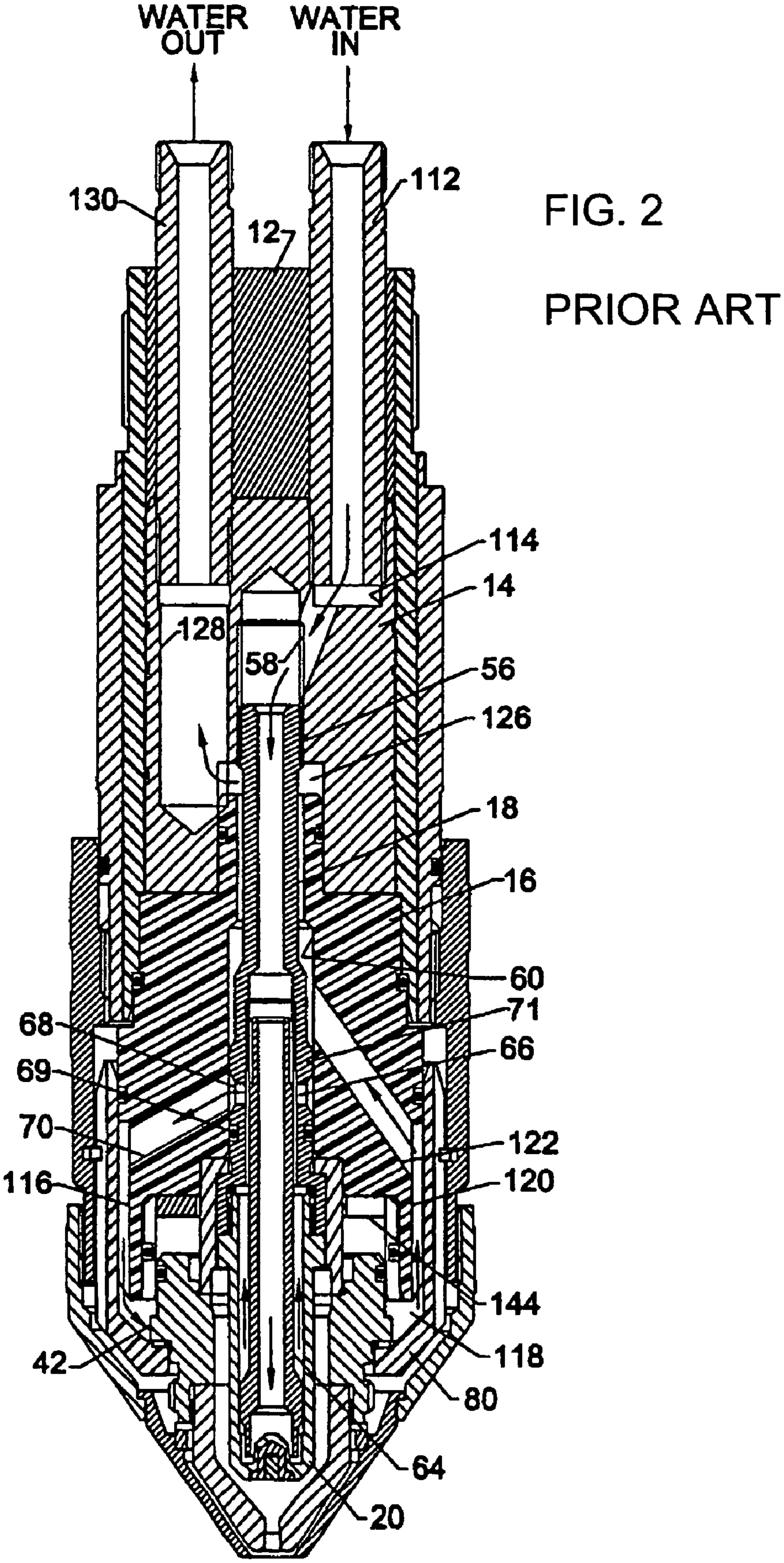
FIG. 2 PRIOR ART
FIG. 2 is a sectioned side elevation of the torch of FIG. 1, taken on a plane rotated with respect to the plane of FIG. 1.

With primary reference to FIG. 2, the coolant circuits for cooling the electrode 20 and nozzle assembly 22 are now described. The torch 10 includes a coolant inlet connector tube 112 which extends through the rear insulator body 12 and is secured within a coolant inlet passage 114 in the main torch body 14. The coolant inlet passage 114 connects to the center axial bore 58 in the main torch body. Coolant is thus supplied into the bore 58 and thence into the internal passage through the electrode holder 56, through the internal passage of the coolant tube 64, and into the space between the tube 64 and the electrode 20. Heat is transferred to the liquid coolant from the lower end of the electrode (from which the arc emanates) and the liquid then flows through a passage between the lower end of the coolant tube 64 and the electrode 20 and upwardly through the annular space between the coolant tube 64 and the electrode 20, and then into the annular space between the coolant tube 64 and the electrode holder 18.

The coolant then flows out through the holes 66 into the space 68 and into the passage 70 through the insulator body 16. The seal 69 prevents the coolant in the space 68 from flowing toward the coupler 62 at the lower end of the holder 56, and the dam 71 substantially prevents coolant from flowing past the dam 71 in the other direction, although there is not a positive seal between the dam 71 and the inner wall of the bore 60. Thus, the coolant in space 68 is largely constrained to flow into the passage 70. The insulator body 16 includes a groove or flattened portion 116 which permits coolant to flow from the passage 70 between the insulator body 16 and the nozzle retaining cup 80 and into a coolant chamber 118 which surrounds the upper nozzle member 42. The coolant flows around the upper nozzle member 42 to cool the nozzle assembly.

Coolant is returned from the nozzle assembly via a second groove or flattened portion 120 angularly displaced from the portion 116, and into a coolant return passage 122 in the insulator body 16. The coolant return passage 122 extends into a portion of the axial bore 60 which is separated from the coolant supply passage 70 by the dam 71. The coolant then flows between the electrode holder 56 and the inner wall of the bore 60 and the bore 58 in the main torch body 14 into an annular space 126 which is connected with a coolant return passage 128 formed in the main torch body 14, and out the coolant return passage 128 via a coolant return connector tube 130 secured therein. Typically, returned coolant is recirculated in a closed loop back to the torch after being cooled.

During starting of the torch 10, a difference in electrical voltage potential is established between the electrode 20 and the nozzle tip 48 so that an electric arc forms across the gap therebetween. Plasma gas is then flowed through the nozzle assembly 22 and the electric arc is blown outward from the nozzle orifice 50 until it attaches to a workpiece, at which point the nozzle assembly 22 is disconnected from the electric source so that the arc exists between the electrode 20 and the workpiece. The torch is then in a working mode of operation.

For controlling the work operation being performed, it is known to use a control fluid such as a shielding gas to surround the arc with a swirling curtain of gas. To this end, the insulator body 16 includes a shielding gas passage 72 that extends from the upper end face 34 axially into the insulator body, and then angles outwardly and extends through the cylindrical outer surface of the insulator body. A nozzle retaining cup assembly 74 surrounds the insulator body 16 to create a generally annular shielding gas chamber 76 between the insulator body 16 and the nozzle retaining cup assembly 74. Shielding gas is supplied through the shielding gas passage 72 of the insulator body 16 into the shielding gas chamber 76.

The nozzle retaining cup assembly 74 includes a nozzle retaining cup holder 78 and a nozzle retaining cup 80 that is secured within the holder 78 by a snap ring 81 or the like. The nozzle retaining cup holder 78 is a generally cylindrical sleeve, preferably formed of metal, that is threaded over the lower end of a torch outer housing 82 that surrounds the main torch body 14. Insulation 84 is interposed between the outer housing 82 and the main torch body 14. The nozzle retaining cup 80 preferably is formed of plastic and has a generally cylindrical upper portion that is secured within the cup holder 78 by the snap ring 81 and a generally frusto-conical lower portion that extends toward the end of the torch and includes an inwardly directed flange 86. The flange 86 confronts an outwardly directed flange 88 on the upper nozzle member 42 and contacts an O-ring 90 disposed therebetween. Thus, in threading the nozzle retaining cup assembly 74 onto the outer housing 82, the nozzle retaining cup 80 draws the nozzle assembly 22 upward into the metal insert sleeve 44 in the insulator body 16. The nozzle assembly 22 is thereby made to contact an electrical contact ring secured within the counterbore 37 of the insulator body 16.

The nozzle retaining cup 80 fits loosely within the cup holder 78, and includes longitudinal grooves 92 in its outer surface for the passage of shielding gas from the chamber 76 toward the end of the torch. Alternatively or additionally, grooves (not shown) may be formed in the inner surface of the cup holder 78. The nozzle retaining cup 80 and cup holder 78 collectively form a nozzle retaining cup assembly. A shielding gas nozzle 94 of generally frustoconical form concentrically surrounds and is spaced outwardly of the nozzle tip 48 and is held by a shield retainer 96 that is threaded over the lower end of the cup holder 78. A shielding gas flow path 98 thus extends from the longitudinal grooves 92 in retaining cup 80, between the shield retainer 96 and the retaining cup 80 and upper nozzle member 42, and between the shielding gas nozzle 94 and the plasma gas nozzle tip 48.

The shielding gas nozzle 94 includes a diffuser 100 that in known manner imparts a swirl to the shielding gas flowing into the flow path between the shielding gas nozzle 94 and the nozzle tip 48. Thus, a swirling curtain of shielding gas is created surrounding the jet of plasma gas and the arc emanating from the nozzle exit orifice 50. The diffuser 100 can be made of an insulating material to electrically insulate the nozzle and shielding gas nozzle from each other.

In the known torch 10 of FIGS. 1 and 1A, when it is desired to replace the electrode 20, it is necessary to first unscrew the shield retainer 96 from the cup holder 78 and remove the shield retainer 96, the shielding gas nozzle 94, and the diffuser 100. Next, the cup holder 78 is unscrewed from the torch outer housing 82 and the cup holder 78 and retaining cup 80 are removed. The nozzle assembly 22 is then removed to gain access to the electrode 20. The electrode can then be unscrewed from the electrode holder 56 and a replacement electrode can be screwed into the electrode holder. The torch is then reassembled by reversing the above-described disassembly sequence. It will be appreciated that this disassembly and assembly process is relatively time-consuming because of the number of separate steps that must be performed.

Figure 3:
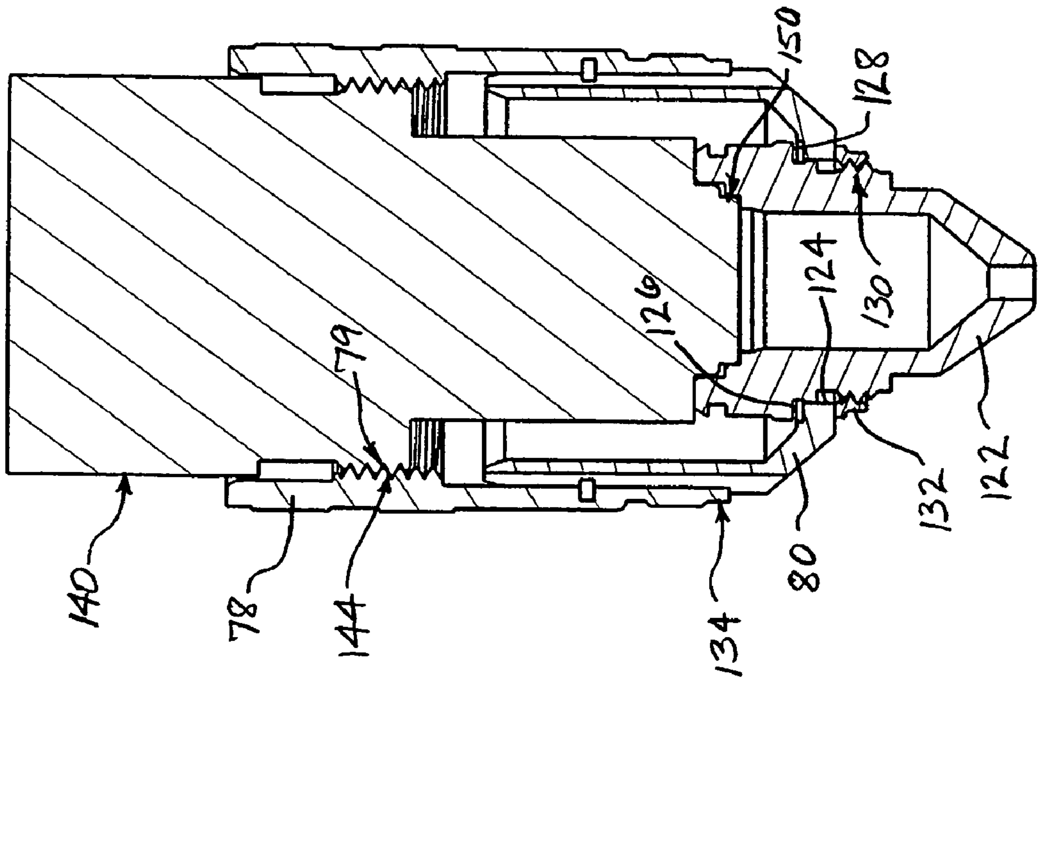
FIG. 3 is a sectioned side elevation of an assembly fixture supporting a pre-assembled unit of front end torch parts in accordance with one embodiment of the invention.

The present invention addresses this problem. As illustrated in FIG. 3, the assembly and disassembly of the torch is facilitated by providing the nozzle retaining cup assembly 78, 80 and the nozzle 122 as a cohesive unit that is removable from the torch body assembly as a unit and replaceable as a unit. In the illustrated embodiment, the nozzle 122 is a one-piece structure, but alternatively the nozzle can be a two-piece nozzle 22 generally as described previously, as long as the nozzle has the features facilitating its attachment to the nozzle retaining cup assembly 78, 80 as explained below.

In this regard, the retaining cup 80 at its front end defines an aperture 124, and a rear-facing surface 126 that surrounds the aperture 124. The aperture 124 and the nozzle 122 are configured such that a front portion of the nozzle can pass through the aperture and project out from the front end of the retaining cup 80, and such that a front-facing surface 128 of the nozzle opposes the rear-facing surface 126 of the retaining cup. The front portion of the nozzle that projects out from the front end of the retaining cup includes an externally threaded portion 130 adjacent a front end face of the retaining cup. An internally threaded retainer 132 is screwed onto the externally threaded portion 130 of the nozzle such that the retainer abuts the front end face of the retaining cup 80 and thereby urges the front-facing surface 128 of the nozzle against the rear-facing surface 126 of the retaining cup. A resiliently compressible sealing element such as an O-ring (see element 90 in FIG. 1A) can be disposed between these surfaces to seal the interface between the nozzle and retaining cup. The engagement of the retainer 132 with the nozzle portion 130 thus secures the nozzle to the nozzle retaining cup assembly 78, 80 so as to form a unit 134 that can be installed into and removed from the torch body assembly in a single step.

Figure 4:
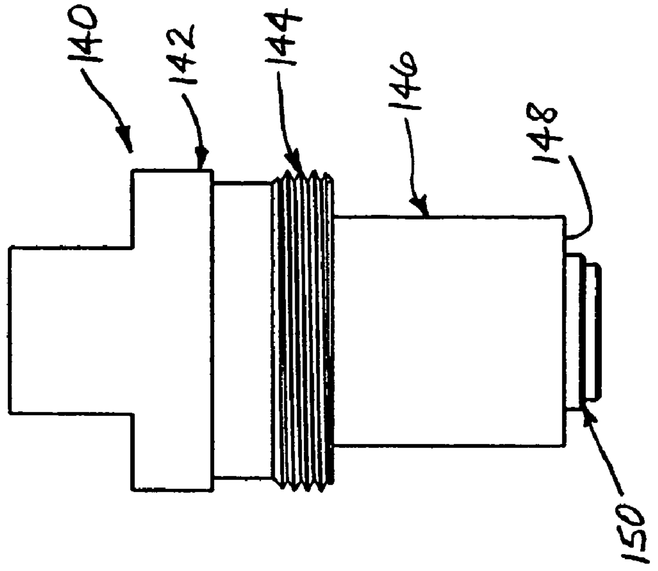
FIG. 4 is a side elevation of the assembly fixture.

FIG. 3 also illustrates the use of an assembly fixture 140 to facilitate assembly of the unit 134. The assembly fixture can be fixedly secured to a suitable support (e.g., a work bench) so that it is prevented from moving or rotating during its use. The assembly fixture, shown in isolated side elevation in FIG. 4, comprises a substantially rigid body of suitable material such as brass, aluminum alloy, steel, or the like. The fixture has a generally cylindrical portion 142 whose outside diameter is slightly smaller than the inside diameter of the cup holder 78 at the cylindrical portion 142 can be received within the cup holder. The cup holder 78 includes an internally threaded portion 79 (FIG. 3) for forming a releasable connection with an externally threaded portion of the torch outer housing 82 (see FIG. 1A). The cylindrical portion 142 of the assembly fixture includes an externally threaded portion 144 that is configured to form a releasable connection with the internally threaded portion 79 of the cup holder.

Extending forward from the externally threaded portion 144 of the fixture is a generally cylindrical portion 146 of smaller outside diameter. A front end of the portion 146 defines a generally annular support surface 148 concentric with a central longitudinal axis of the assembly fixture and concentric with the cylindrical portion 142 and threaded portion 144. A centering portion 150 projects forward from the front end of the fixture and is configured to fit into the central bore of the nozzle 122 and engage the inner surface of the bore so as to position the nozzle 122 concentrically with respect to the fixture's axis.

With reference to FIG. 3, to assemble the unit 134, the nozzle 122 is placed on the fixture 140 with the rear end of the nozzle engaging the support surface 148 and with the centering portion 150 of the fixture inserted into the bore of the nozzle. A sealing element such as an O-ring (not shown, but see element 90 in FIG. 1A) is placed on the front-facing surface 128 of the nozzle. The nozzle retaining cup assembly 78, 80 is then placed over the nozzle such that the front end portion of the nozzle passes through the aperture 124 of the retaining cup 80, and the cup holder 78 is screwed onto the threaded portion 144 of the fixture. The externally threaded portion 130 of the nozzle projects out from the aperture 124 of the retaining cup. The internally threaded retainer 132 is then screwed onto the externally threaded portion 130 of the nozzle such that the nozzle and retaining cup are urged together to compress the O-ring. Finally, the cup holder 78 is unscrewed from the fixture. The entire unit 134 comprising the nozzle retaining cup assembly 78, 80, the nozzle 122, and the retainer 132 is thereby removed from the fixture.

The unit 134 can then be combined with other components. For example, the diffuser 100 can be placed about the nozzle 122 and the shielding gas nozzle 94 and shield retainer 96 can be connected to the unit 134 by forming a releasable connection between the shield retainer 96 and the cup holder 78. In this regard, the shield retainer can be internally threaded at its rear end for engaging an externally threaded front end of the cup holder, as depicted in FIG. 1A. Thus, all of the front end parts of the torch form a single unit that is pre-assembled and can then be installed on the torch body assembly by screwing the cup holder 78 onto the torch outer housing 82.

Disassembly is effected by reversing the sequence of assembly steps described above. More particularly, the unit comprising all of the front end parts is removed from the torch body assembly by unscrewing the cup holder 78 from the torch outer housing 82, thus gaining access to the electrode 20. The electrode can then be removed and replaced, and the unit then reassembled to the torch body assembly.

In the event that the nozzle 122 requires replacement, the unit is removed from the torch as noted above and is secured to the assembly fixture 140 by screwing the cup holder 78 onto the threaded portion 144 of the fixture. The shield retainer 96 is unscrewed from the cup holder 78 and the shield retainer 96, shielding gas nozzle 94, and diffuser 100 are removed. The retainer 132 is then unscrewed and removed, and the cup holder 78 is unscrewed from the fixture and removed along with the retaining cup 80. The nozzle can then be removed from the fixture and a replacement nozzle placed on the fixture. The unit of front end parts is then reassembled and installed in the torch body assembly as previously described.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A plasma arc torch, comprising:

a torch body assembly comprising a generally cylindrical torch body and an insulator body disposed in the torch body;

an electrode assembly mounted in the torch body assembly, an electrode of the electrode assembly projecting out from a front end of the insulator body;

a nozzle engaged with the torch body assembly and defining a central bore extending therethrough for directing a flow of a plasma gas from the central bore through an exit orifice defined in a front end of the nozzle, the nozzle comprising an externally threaded portion and a front-facing surface spaced rearwardly of the externally threaded portion;

a hollow generally cylindrical nozzle retaining cup assembly comprising a rear portion forming a releasable connection with the torch body assembly and a front portion defining an aperture through which the externally threaded portion of the nozzle projects, the front portion further defining a rear-facing surface surrounding the aperture and opposing the front-facing surface of the nozzle; and an internally threaded retainer engaging the externally threaded portion of the nozzle and engaging the front portion of the nozzle retaining cup assembly to urge the front-facing surface of the nozzle toward the rear-facing surface of the nozzle retaining cup assembly so as to retain the nozzle retaining cup assembly and the nozzle together as a unit, said unit being removable from the torch body assembly by disengaging the releasable connection between the nozzle retaining cup assembly and the torch body assembly so as to provide access to the electrode assembly.

2. The plasma arc torch of claim 1, wherein the releasable connection between the nozzle retaining cup assembly and the torch body assembly comprises a threaded connection.

3. The plasma arc torch of claim 1, further comprising:

a shielding gas nozzle engaging the nozzle and concentrically surrounding the nozzle such that a shielding gas flow passage is defined between a radially inner surface of the shielding gas nozzle and a radially outer surface of the nozzle; and a shield retainer engaging the shielding gas nozzle to retain the shielding gas nozzle in engagement with the nozzle, the shield retainer forming a releasable connection with the nozzle retaining cup assembly;

the shielding gas nozzle and shield retainer forming part of said unit that is removable from the torch body assembly for accessing the electrode.

4. The plasma arc torch of claim 3, further comprising a diffuser disposed between the shielding gas nozzle and the nozzle for conditioning a flow of shielding gas through the shielding gas flow passage.

5. The plasma arc torch of claim 3, wherein the nozzle retaining cup assembly includes an externally threaded portion and the shield retainer includes an internally threaded portion forming said releasable connection with said externally threaded portion of the nozzle retaining cup assembly.

6. The plasma arc torch of claim 1, further comprising a sealing element disposed between the rear-facing surface of the nozzle retaining cup assembly and the front-facing surface of the nozzle.

7. The plasma arc torch of claim 1, wherein the nozzle retaining cup assembly comprises a retaining cup defining the aperture and the rear-facing surface, and a cup holder formed separately from the retaining cup, the cup holder forming the releasable connection with the torch body assembly, the cup holder being affixed to the retaining cup.

8. The plasma arc torch of claim 7, wherein the cup holder is electrically conductive and the retaining cup is electrically insulating.

9. A method for assembling a plasma arc torch that includes a torch body assembly comprising a generally cylindrical torch body and an insulator body disposed in the torch body, and an electrode assembly mounted in the torch body assembly, an electrode of the electrode assembly projecting out from a front end of the insulator body, the method comprising the steps of:

providing a nozzle structured and arranged to be engaged with the torch body assembly and defining a central bore extending therethrough for a flow of a plasma gas that is discharged from the central bore through an exit orifice defined in a front end of the nozzle, the nozzle comprising an externally threaded portion and a front-facing surface spaced rearwardly of the externally threaded portion;

providing a hollow generally cylindrical nozzle retaining cup assembly comprising a rear portion structured and arranged to form a releasable connection with the torch body assembly and a front portion defining an aperture sized to receive the externally threaded portion of the nozzle therethrough, the front portion further defining a rear-facing surface surrounding the aperture for opposing the front-facing surface of the nozzle;

providing an internally threaded retainer structured and arranged to engage the externally threaded portion of the nozzle;

positioning the rear-facing surface of the nozzle retaining cup assembly in opposition with the front-facing surface of the nozzle such that the externally threaded portion of the nozzle projects out from the aperture;

engaging the internally threaded retainer with the externally threaded portion of the nozzle and with the front portion of the nozzle retaining cup assembly to retain the nozzle retaining cup assembly and the nozzle together as a unit; and assembling said unit with the torch body assembly by forming the releasable connection between the nozzle retaining cup assembly and the torch body assembly.

10. The method of claim 9, wherein the positioning step comprises:

providing an assembly fixture having a connection portion structured and arranged to form a releasable connection with the rear portion of the nozzle retaining cup assembly, the assembly fixture defining a support surface for engaging a rear end of the nozzle and a centering portion for engaging the nozzle so as to position the nozzle concentrically with respect to the assembly fixture;

positioning the nozzle on the assembly fixture with the rear end of the nozzle on the support surface and the centering portion of the assembly fixture engaging the nozzle; and placing the retaining cup assembly over the nozzle on the assembly fixture such that the externally threaded portion of the nozzle projects through the aperture and the rear-facing surface of the nozzle retaining cup assembly opposes the front-facing surface of the nozzle, and forming the releasable connection between the rear portion of the retaining cup assembly and the connection portion of the assembly fixture.

11. The method of claim 10, wherein the step of engaging the internally threaded retainer with the externally threaded portion of the nozzle so as to form said unit is performed while the nozzle and nozzle retaining cup assembly are positioned on the assembly fixture, and further comprising the step of removing said unit from the assembly fixture prior to assembling said unit with the torch body assembly.

12. The method of claim 11, further comprising, after said unit is removed from the assembly fixture and prior to assembling said unit with the torch body assembly, the steps of:

engaging a shielding gas nozzle with the nozzle and concentrically surrounding the nozzle such that a shielding gas flow passage is defined between a radially inner surface of the shielding gas nozzle and a radially outer surface of the nozzle; and engaging a shield retainer with the shielding gas nozzle to retain the shielding gas nozzle in engagement with the nozzle.

13. The method of claim 12, wherein the step of engaging the shield retainer with the shielding gas nozzle includes forming a releasable connection between the shield retainer and the nozzle retaining cup assembly.

14. The method of claim 13, wherein the step of forming the releasable connection between the shield retainer and the nozzle retaining cup assembly comprises engaging an internally threaded portion of the shield retainer with an externally threaded portion of the nozzle retaining cup assembly.

15. The method of claim 10, wherein the step of forming the releasable connection between the rear portion of the retaining cup assembly and the connection portion of the assembly fixture comprises engaging threads on the rear portion of the nozzle retaining cup assembly with threads on the assembly fixture.

16. The method of claim 9, further comprising the step of positioning a sealing element on the front-facing surface of the nozzle prior to the step of positioning the rear-facing surface of the nozzle retaining cup assembly in opposition with the front-facing surface of the nozzle.

17. The method of claim 16, wherein the sealing element is resiliently compressible, and the step of engaging the internally threaded retainer with the externally threaded portion of the nozzle and with the front portion of the nozzle retaining cup assembly causes the sealing element to be compressed between the nozzle retaining cup assembly and the nozzle.

18. The method of claim 9, further comprising disassembling the plasma arc torch, the disassembling step comprising the steps of:

disengaging the releasable connection between the nozzle retaining cup assembly and the torch body assembly; and removing said unit from the torch body assembly so as to provide access to the electrode assembly.

19. The method of claim 9, further comprising replacing the electrode assembly, the replacing step comprising the steps of:

disengaging the releasable connection between the nozzle retaining cup assembly and the torch body assembly;

removing said unit from the torch body assembly so as to provide access to the electrode assembly;

removing the electrode assembly from the torch body assembly and installing a replacement electrode assembly in the torch body assembly; and re-assembling said unit with the torch body assembly by reestablishing the releasable connection between the nozzle retaining cup assembly and the torch body assembly.

* * * * *